T. A. COLEMAN.
CHAIN CONVEYER.
APPLICATION FILED MAR. 11, 1909.

943,734.

Patented Dec. 21, 1909.

FIG. 2ª.

WITNESSES
Alma Gebhart
Lenore Clark

INVENTOR
THOMAS A. COLEMAN
BY
F. R. Cornwall ATT'Y.

UNITED STATES PATENT OFFICE.

THOMAS A. COLEMAN, OF LONGVILLE, LOUISIANA, ASSIGNOR TO C. T. PATTERSON COMPANY, LTD., OF NEW ORLEANS, LOUISIANA, A CORPORATION OF LOUISIANA.

CHAIN CONVEYER.

943,734.

Specification of Letters Patent.

Patented Dec. 21, 1909.

Application filed March 11, 1909. Serial No. 482,751.

*To all whom it may concern:*

Be it known that I, THOMAS A. COLEMAN, a citizen of the United States, residing at Longville, Louisiana, have invented a certain new and useful Improvement in Chain Conveyers, of which the following is a full, clear, and exact description, such as will enable others skilled in the art to which it appertains to make and use the same, reference being had to the accompanying drawings, forming part of this specification, in which—

Figure 1:
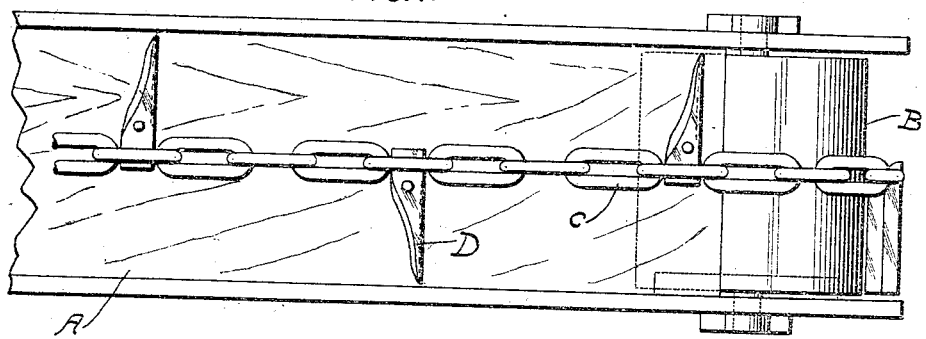
Figure 2:
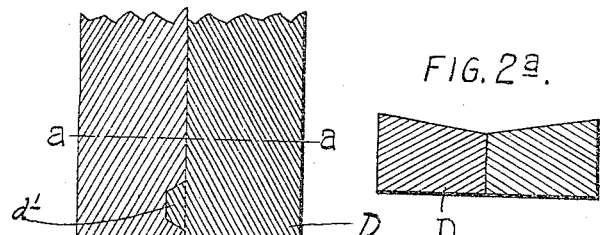
Figure 3:
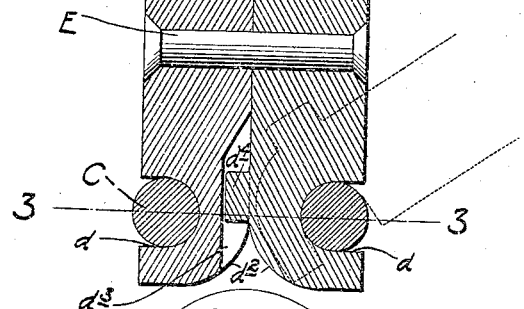
Figure 3:
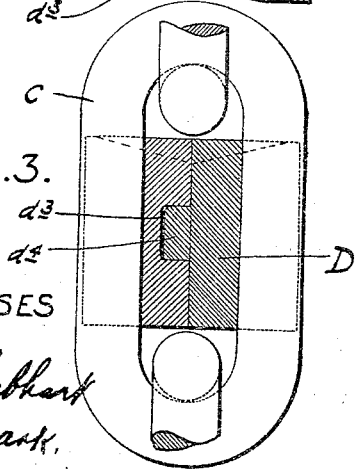

Figure 1 is a top plan view of a trough in which is arranged a section of my improved chain conveyer; Fig. 2 is an enlarged sectional view through one of the flights; Fig. 3 is a cross sectional view on line 3—3, Fig. 2; Fig. 2ª is a sectional view on line $a$—$a$ Fig. 2.

This invention relates to a new and useful improvement in chain conveyers especially adapted for use in carrying off refuse lumber from sawmills, etc., being designed as an improvement on the chain conveyer illustrated in United States Letters Patent No. 627,482, granted to me June 27, 1899.

The essential features of my present invention reside in the novel construction of the flight, which is made in two parts, the line of division occurring at such point that the two parts, when assembled and secured together within the links of a chain, will be held in position by the chain, the strength of the chain not being impaired in any way.

In the drawings, A indicates the trough, at one end of which is a sheave B, C indicating an ordinary chain. The above parts may be similar to those described in my aforesaid Patent No. 627,482.

D indicates the flights of my improved conveyer-chain, which, as shown in Figs. 1 to 3 inclusive, consists of two castings, each casting comprising practically a longitudinal half of the flight proper. In the upper and lower faces of the large ends of these castings are grooves or recesses $d$ for the reception of the chain links. At the division line between the castings is an interlocking dowel $d^1$, whose function is to prevent the castings from moving relative to each other when assembled in the links of the chain.

The ends of the castings, wherein the grooves $d$ are located, are rounded as at $d^2$, the purpose of which rounding is to enable castings to be moved into position, as shown by dotted lines in Fig. 2, the link of the chain constituting a pivotal axis about which each portion of the axis may be moved in assembling and removing the parts of the flight. One of the castings, on its inner face, is provided with a groove $d^3$, and the companion casting with a projection $d^4$, designed to fit in said groove when parts are assembled, so as to prevent independent movement of the parts. A rivet E is employed to secure the parts of the casting together after assemblage.

I am aware that minor changes in the construction, arrangement and combination of the several parts of my device can be made and substituted for those herein shown and described without in the least departing from the nature and principle of my device.

The faces of the flights are concaved or recessed as shown in Fig. 2ª for the purpose of more effectually handling the refuse.

Having thus described my invention, what I claim is:

1. A flight for conveyer chains comprising a carrying member divided substantially throughout its entire length, the adjacent faces of the parts thereof having registering recesses and projections, whereby the parts are prevented from movement in all directions except a pivotal movement about the link of the chain on which they are mounted, and means for fastening said parts together against said pivotal movement.

2. In a conveyer-chain, the combination with the chain proper, a flight comprising two castings, both of which are provided with link-receiving recesses, the ends of said castings being cut away so that the parts may be swung on said links, and means for holding said parts in position against movement, when assembled within a link.

3. In a conveyer-chain, the combination with the chain proper, of a flight divided longitudinally and having interlocking means at the division line, the ends of said flight being recessed to receive a link, and being cut away, whereby the parts of said flight may be swung on said link, and a rivet for securing said parts together.

In testimony whereof I hereunto affix my signature in the presence of two witnesses, this 27th day of February 1909.

THOMAS A. COLEMAN.

Witnesses:
  H. T. ROEHL,
  E. W. ZOOMER.